July 26, 1938.    F. GOUVERNEUR    2,124,818
MILLING CUTTER WITH HELICAL TEETH
Filed Feb. 5, 1937

F. Gouverneur
Inventor

By Glascock Downing & Seebold
Attys.

Patented July 26, 1938

2,124,818

UNITED STATES PATENT OFFICE 2,124,818

MILLING CUTTER WITH HELICAL TEETH

Fernand Gouverneur, Paris, France

Application February 5, 1937, Serial No. 124,312
In France February 5, 1936

2 Claims. (Cl. 29—103)

The milling cutters with helical teeth which are in present use comprise teeth which are cut according to helices whose angle with the axial direction is established in such manner as to facilitate the cutting by the shearing of the material to be trimmed. This angle of the helices may vary from one tool to another according to the hardness or the nature of the material to be trimmed by the cutter, but as a general rule, a somewhat large angle is employed in order to obtain a great irregularity in the thickness of the chip and to prevent vibration when at work, and this angle is the same throughout the whole length of the milling cutter. Owing to this great angle of the helices, each tooth is weakened at its end, as its outline is very sharp, and it thus shows at the end an insufficient mass of metal to absorb and disperse the heat produced by the cutting work. For this reason, the tool will be rapidly worn down, and will often break at the ends of the teeth.

The present invention has for its object to eliminate the above-mentioned drawbacks by the use of a milling cutter whose spiral lateral teeth are cut according to curves whose angle with the axial direction is smaller at the end of the cutter than in the rear of this end. For instance, the angle may have a certain value which is rather small at the end, and then increases gradually upon a length of a few centimeters, until it reaches the normal angle of the cutter which is to be used, for instance 38°.

The accompanying drawing shows an embodiment of the invention.

Figure 1:
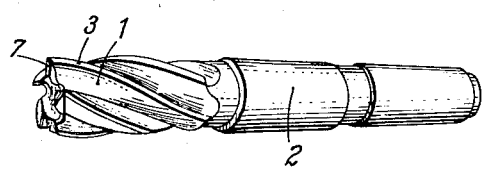
Fig. 1 represents the milling cutter according to the invention, viewed in perspective.
Figure 2:
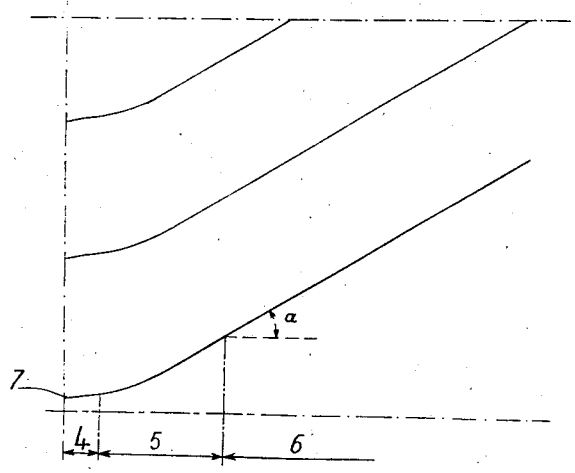
Fig. 2 is a developed form.

Each tooth 1 of the milling cutter 2 is cut according to a curve 3, which, when developed, comprises, from front to rear, a straight part 4 which is slightly inclined from the axis of the cutter, a curved part 5 along which the angle of inclination increases, and lastly, a straight part 6 whose inclination a corresponds to the main inclination which it is desired to obtain upon the greater part of the length of the cutter, for instance 38°. The main inclination mentioned is the inclination along the main or greater part of the lateral teeth, and its value usually lies near 38°. In this manner, the end 7 of each tooth will have an outline which is less sharp and is hence stronger. On the other hand, in spite of the increased strength of the tooth at the end, this tooth maintains the advantage of a ready cutting by shearing action, with a large angle of the spiral lateral teeth upon the greater part of its length corresponding to the part 6 of the development.

It is supposed in the drawing that the initial angle has been preserved upon a certain length, for instance, a few millimeters (part 4 of the development) and that the gradual increase of the angle only takes place at a short distance in the rear (part 5 of the development), but it is obvious that the increase of the angle may commence even at the end of the tooth.

The cutting of the teeth in conformity with the invention may be effected upon a milling machine with reproducing device, or upon a special machine adapted for the automatic correction of the characteristics of the work.

I claim:

1. A milling cutter of the kind including a cylindrical body provided with spiral lateral teeth terminating in end cutting edges, the spiral teeth being cut according to curves whose angle of inclination to the longitudinal axis of the cutter is smaller at the end than in the remaining part of the body thereof.

2. A milling cutter of the kind described including a cylindrical body provided with spiral lateral teeth terminating in end cutting edges, the spiral teeth being cut according to curves whose angle of inclination to the longitudinal axis is somewhat small at the end of the cutter and then gradually increases along a small fraction of the length of the cutter until it reaches the main value of the inclination which remains uniform upon the greater part of the length of the cutter.

FERNAND GOUVERNEUR.